(12) United States Patent
Harres

(10) Patent No.: US 8,194,239 B2
(45) Date of Patent: Jun. 5, 2012

(54) MIXER-BASED TIME DOMAIN REFLECTOMETER AND METHOD

(75) Inventor: Daniel N. Harres, Belleville, IL (US)

(73) Assignee: The Boeing Company, Chicago, IL (US)

( * ) Notice: Subject to any disclaimer, the term of this patent is extended or adjusted under 35 U.S.C. 154(b) by 442 days.

(21) Appl. No.: 12/436,206

(22) Filed: May 6, 2009

(65) Prior Publication Data

US 2010/0079746 A1    Apr. 1, 2010

Related U.S. Application Data

(60) Division of application No. 11/277,239, filed on Mar. 23, 2006, now Pat. No. 7,667,830, which is a continuation-in-part of application No. 10/845,398, filed on May 13, 2004, now Pat. No. 7,030,975.

(51) Int. Cl.
*G01N 21/00* (2006.01)

(52) U.S. Cl. ..................................... 356/73.1

(58) Field of Classification Search ........................ None
See application file for complete search history.

(56) References Cited

U.S. PATENT DOCUMENTS

| | | | |
|---|---|---|---|
| 4,833,668 A | 5/1989 | Rowley et al. | |
| 5,093,568 A | 3/1992 | Maycock | |
| 5,353,110 A | 10/1994 | Jones | |
| 5,450,191 A | 9/1995 | Parks et al. | |
| 5,467,942 A | 11/1995 | Abbas et al. | |
| 5,479,251 A | 12/1995 | Hanson | |
| 5,530,546 A | 6/1996 | Barringer et al. | |
| 5,592,284 A | 1/1997 | Bedard | |
| 5,809,187 A | 9/1998 | Peck, Jr. et al. | |
| 5,956,131 A * | 9/1999 | Mamyshev et al. | 356/73.1 |
| 5,995,255 A | 11/1999 | Giles | |
| 6,046,797 A | 4/2000 | Spencer et al. | |
| 6,317,535 B1 | 11/2001 | Jennings et al. | |
| 6,376,830 B1 | 4/2002 | Froggatt et al. | |
| 6,381,010 B1 | 4/2002 | Piffaretti | |
| 6,381,011 B1 | 4/2002 | Nickelsberg et al. | |
| 6,381,270 B1 | 4/2002 | Lydon et al. | |
| 6,456,370 B1 | 9/2002 | Ingles, Jr. | |

(Continued)

FOREIGN PATENT DOCUMENTS

WO    2004003502    1/2004

(Continued)

OTHER PUBLICATIONS

The Boeing Company, International Search Report corresponding to International Patent Application No. PCT/US2007/080921 dated Feb. 29, 2008.

(Continued)

*Primary Examiner* — Tu Nguyen
(74) *Attorney, Agent, or Firm* — Charles L. Moore; Moore & Van Allen PLLC

(57) ABSTRACT

An apparatus to measure optical characteristics of a fiber optic transmission line or other optical medium may include a source to generate a bipolar pulse signal waveform. The apparatus may also include a mixer to mix the bipolar pulse signal waveform and an optical pulse and reflected signal waveform from the fiber optic transmission line or other optical medium to form a mixed product waveform, wherein the reflected signal is responsive to the optical pulse being transmitted into the fiber optic transmission line or optical medium.

8 Claims, 5 Drawing Sheets

U.S. PATENT DOCUMENTS

| | | |
|---|---|---|
| 6,470,120 B2 | 10/2002 | Green et al. |
| 6,519,026 B1 | 2/2003 | Holland |
| 6,577,385 B1 | 6/2003 | Sakamoto et al. |
| 6,614,512 B1 | 9/2003 | Sakamoto et al. |
| 6,674,518 B1 | 1/2004 | Asher et al. |
| 6,674,936 B2 * | 1/2004 | Jacobowitz et al. ............ 385/24 |
| 6,700,655 B2 | 3/2004 | Uchiyama et al. |
| 6,724,469 B2 | 4/2004 | Leblanc |
| 6,771,361 B2 | 8/2004 | Araki et al. |
| 6,862,397 B2 | 3/2005 | Harres et al. |
| 7,011,453 B1 | 3/2006 | Harres |
| 7,027,685 B2 | 4/2006 | Harres |
| 7,030,975 B2 | 4/2006 | Harres |
| 7,050,665 B2 | 5/2006 | Harres et al. |
| 7,095,493 B2 | 8/2006 | Harres |
| 7,133,610 B1 * | 11/2006 | Shimura et al. ................. 398/15 |
| 2004/0062553 A1 | 4/2004 | Harres |
| 2006/0028636 A1 | 2/2006 | Payton |

FOREIGN PATENT DOCUMENTS

| | | |
|---|---|---|
| WO | 2005068965 | 7/2005 |

OTHER PUBLICATIONS

The Boeing Company, Written Opinion corresponding to International Patent Application No. PCT/US2007/080921 dated Feb. 29, 2008.

Jensen et al., A Broadband 10-GHz Track-and-Hold in Si/SeGe HBT Technology, IEEE J. of Solid-State Circuits, vol. 36, No. 3, Mar. 2001.

* cited by examiner

MIXER-BASED TIME DOMAIN REFLECTOMETER AND METHOD

CROSS-REFERENCE TO RELATED APPLICATIONS

This application is a divisional of U.S. patent application Ser. No. 11/277,239 filed on Mar. 23, 2006, now U.S. Pat. No. 7,667,830, which is a Continuation-in-Part of U.S. patent application Ser. No. 10/845,398 filed on May 13, 2004, now U.S. Pat. No. 7,030,975, the disclosures of which are hereby incorporated by reference herein for all purposes.

This invention was made with Government support under contract N00019-04-C-0005 awarded by the U.S. Navy. The Government has certain rights in this invention.

BACKGROUND OF THE INVENTION

The present invention relates to optical signal transmission systems or the like and more particularly to a mixer-based time domain reflectometer and method for detecting any reflections, anomalies or defects in a fiber optic transmission line or other optical medium.

Transmission lines are commonly employed to communicate signals between various portions of an electronic system. For example, coaxial transmission lines, waveguides, and even parallel arrangements of metallic conductors are typically employed as transmission lines in such systems. Increasingly, fiber-optic transmission lines or other optical media are being used instead of conventional metallic transmission lines to communicate signals in electronic systems due to the generally higher noise immunity and lower signal attenuation properties obtainable in such lines. Additionally, fiber-optic transmission lines are generally thinner and lighter than metallic conductors of comparable capacity.

In systems employing fiber optic transmission lines or the like, difficulties may arise due to degradation of the line resulting from physical damage, aging, poorly matched and/or damaged connectors, or for other reasons. In practice, difficulties with transmission lines are frequently difficult to detect and diagnose, particularly in electronic systems where only a single terminal end of the transmission line may be accessible. Although a number of different methods are available to detect and diagnose transmission line difficulties, one useful and commonly employed method is time domain reflectometry. In time domain reflectometry, an optical pulse or pulses may be transmitted into a fiber optic transmission line or medium. Any anomalies or defects may result in a reflected signal which may be detected by a time domain reflectometer. Such reflectometers are usually formed from standard components as opposed to custom parts to keep costs reasonable. These standard components, such as mixers or the like, may require appropriate input or drive signals and modulation signals for optimum operation and ability to effectively measure and analyze input pulses and reflected waveforms and mixed or modulated waveforms to detect any reflections at selected segments along a fiber optic transmission line or other optical medium.

BRIEF SUMMARY OF THE INVENTION

In accordance with an embodiment of the present invention, an apparatus to measure optical characteristics of a fiber optic transmission line or other optical medium may include a source to generate a bipolar pulse signal waveform. The apparatus may also include a mixer to mix the bipolar pulse signal waveform and an optical pulse and reflected signal waveform from the fiber optic transmission line or other optical medium to form a mixed product waveform, wherein the reflected signal is responsive to the optical pulse being transmitted into the fiber optic transmission line or optical medium.

In accordance with another embodiment of the present invention, an optical system may include a fiber optic transmission line or optical medium. The system may also include a mixer-based optical time domain reflectometer with a bipolar local oscillator to measure optical characteristics of the transmission line or optical medium.

In accordance with another embodiment of the present invention, an aerospace vehicle may include a fuselage and other components. The aerospace vehicle may also include a fiber optic transmission line or optical medium disposed in the fuselage, other components, or both. The aerospace vehicle may further include a mixer-based optical time domain reflectometer with a bipolar local oscillator to measure optical characteristics of the transmission line or optical medium.

In accordance with another embodiment of the present invention, a method to measure optical characteristics from a selected segment of a fiber optic transmission line or other optical medium divided into a predetermined number of segments may include determining an average value or voltage of an optical pulse and reflected signal waveform without any modulation on a local oscillator. The method may also include applying a bipolar pulse on the local oscillator at a time delay corresponding to the selected segment and mixing the bipolar pulse and the optical pulse and reflected signal waveform to form a mixed product waveform. The method may also include determining an average value or voltage of the mixed product waveform.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

The following detailed description of embodiments refers to the accompanying drawings, which illustrate specific embodiments of the invention. Other embodiments having different structures and operations do not depart from the scope of the present invention.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
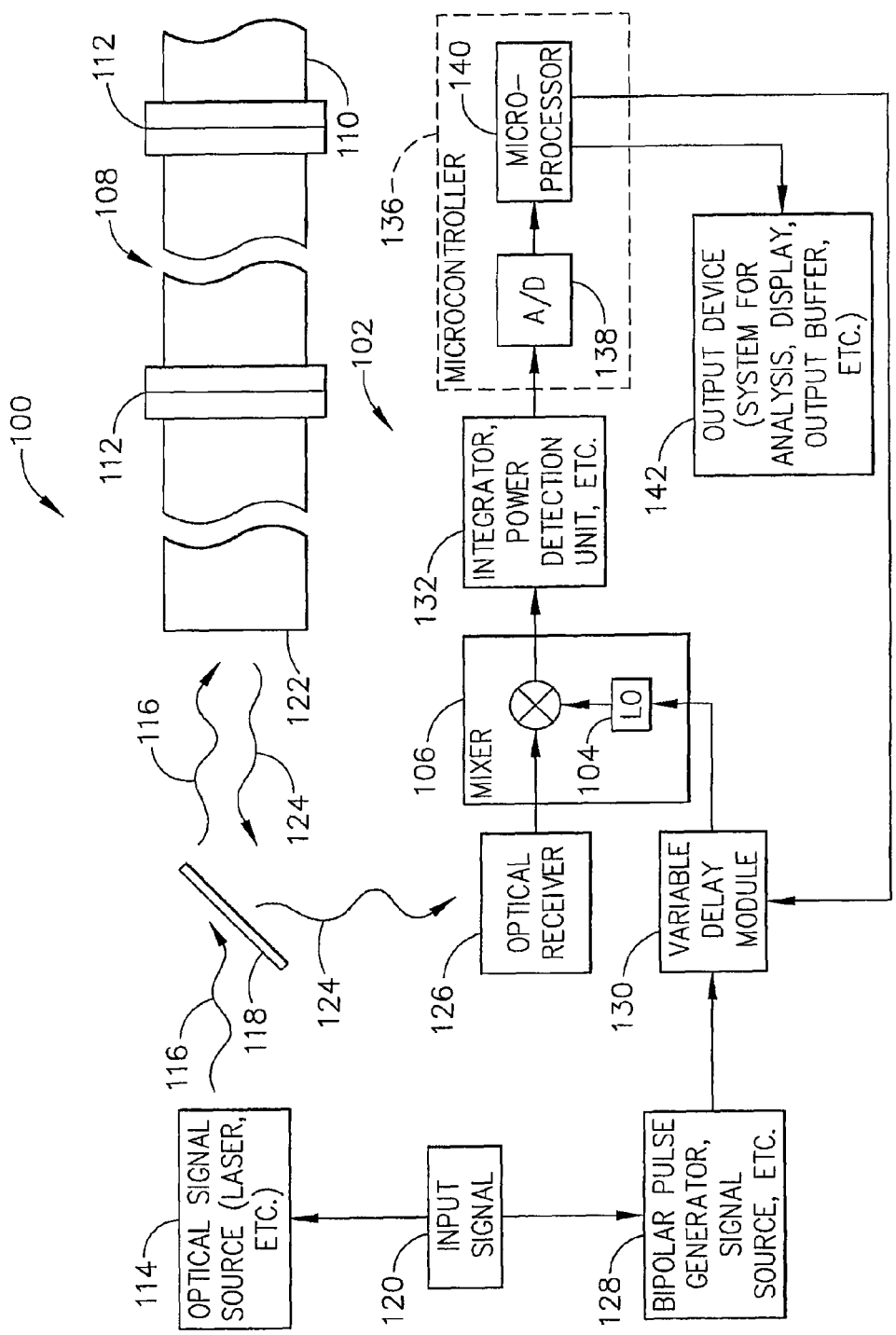
FIG. 1 is a block diagram of an exemplary optical system including a mixer-based time domain reflectometer with a bipolar local oscillator in accordance with an embodiment of the present invention.

FIG. 1 is a block diagram of an exemplary optical system 100 including a mixer-based time domain reflectometer 102 with a bipolar local oscillator 104 in accordance with an embodiment of the present invention. The bipolar local oscillator 104 may be part of the mixer 106 as described in more detail below.

The optical system 100 may include a fiber optic transmission line 108 or other optical medium to transmit optical energy in the form of optical signals. The fiber optic transmission line 108 may be formed by multiple line portions 110 that may each be joined together by suitable optical connectors 112 to minimize signal reflections. The reflectometer 102 may measure optical characteristics of the line 108. Measuring optical characteristics may include, but is not necessarily limited to detecting reflections that may be caused by anomalies in the line 108 or optical medium, such as discontinuities, defects, degradation or the like.

The system 100 may also include an optical signal source 114 to transmit optical signals. The optical signal source 114 may be a laser signal source or other optical source. The optical source 114 may emit one or more relatively short-duration pulses of optical energy towards a partial mirror 118 in response to an input signal 120 or other stimulus. The partial mirror 118 may transmit at least a portion of the optical pulse 116 into a terminal end 122 of the fiber optic transmission line 108. The optical pulse may then propagate along the length of the line 108. When the optical pulse 116 encounters an anomaly in the line 108 or optical medium, optical energy or a reflected signal pulse 124 may be reflected back toward the terminal end 122 of the line 108 or medium. The reflected optical pulse 124 or signal is a function of the difference in indices of refraction between the fiber material and the other material (usually air) at the break. The reflected optical pulse energy 124 may be substantially reflected by the partial mirror 118 into an optical receiver 126. The optical receiver 126 may also detect the original optical signal pulse or energy 116 along with any reflected signals or reflected optical energy 124 responsive to the optical pulse 116. The detected original optical pulse 116 and reflected optical energy 124 or signals may be converted to electrical signals by the optical receiver 126 forming a waveform that may be transmitted to the mixer 106. The mixer 106 may be a commercially available mixer rather than a custom component to maintain reasonable costs. For example, the mixer 106 may be an Analog Devices AD8343 active mixer, available from Analog Devices, Inc. of Norwood, Mass., or a similar device.

The system 100 may also include a bipolar pulse generator 128 or similar signal source to generate a bipolar pulse. The bipolar pulse may include a predetermined characteristic for proper or effective operation of the mixer 106. Many active mixer devices, such as the Analog Devices AD8343, expect a local oscillator input of either about +1 or −1, that is, the device may operate most optimally or efficiently when either substantially heavily turned on in the positive direction or substantially heavily turned on in the negative direction. Accordingly, a negative going bipolar pulse may serve to provide optimal or effective operation of the reflectometer 102 as described in more detail herein.

The bipolar pulse generator 128 may generate the bipolar pulse or pulse waveform in response to the input signal 120 or other stimulus that may also cause the optical energy or pulse 116 to be generated by the optical source 114. The bipolar pulse may be delayed by a variable delay module 130. As described in more detail herein, the variable delay module 130 may delay the bipolar pulse of a bipolar pulse signal waveform by a selected time duration corresponding to any reflection of a signal or pulse from a selected segment of the fiber optic transmission line 108 to measure optical characteristics from the selected segment of the line 108.

The bipolar pulse signal waveform from the variable delay 130 may be applied to the local oscillator 104. The bipolar pulse signal waveform and the optical pulse and reflected signal waveform from the optical receiver 126 may be mixed in the mixer 106 to form a mixed product waveform. Expressed in other terms, the optical pulse and reflected signal waveform may be modulated in the mixer 106 by the bipolar pulse signal waveform. An output of the mixer 106 may be coupled to an integrator 132. The integrator 132 may time average the product signals or mixer output signals to provide a time-averaged output.

The fiber optic transmission line 108 may be divided or segmented into a predetermined number of segments (N) or intervals for purposes of analysis and identifying a location of an anomaly. Because the variable time delay module 130 performs a gating function, the reflected energy signals may be generated only from the segment of the line 108 or medium that corresponds to the selected time delay. The reflected energy signal waveform 124 may then be time averaged by the integrator 132 over the selected time interval and successively repeated for each of the predetermined number of segments (N) to generate an integrated value for the reflected energy or signal waveform over all of the segments of the line 108 or medium.

The system 100 may also include a microcontroller 136 to facilitate determination of the optical characteristics of the line 108 or medium or to detect reflections resulting from anomalies in the line 108. The microcontroller 136 may include an analog-to-digital converter (A/D) 138 to receive the time averaged output signals or waveforms from the integrator 132 and to convert the signals to a corresponding digital signal or waveform.

The microcontroller 136 may also include a microprocessor 140. The microprocessor 140 may perform various control functions and analysis of the waveforms as described in more detail herein. The microprocessor 140 may be coupled to an output device or system 142. In one embodiment of the present invention, the system 142 may perform additional analysis of the waveforms or data generated by the microprocessor 140. In another embodiment of the present invention the device or system 142 may be a display or other output device that may present the waveforms and other data to a user for analysis or evaluation. In a further embodiment, the output device or system 142 may be a buffer or similar storage device to store the data for access by other external systems (not shown).

The microcontroller 140 may also control operation of the variable delay module 130 to selectively delay the bipolar pulse signal to correspond to different segments along the line 108 or medium for measuring optical characteristics or detecting any anomalies or defects along the line 108 or medium.

In another embodiment of the present invention, the integrator 132 may be a radio frequency (RF) power detection unit or the like. The power detection unit 132 may receive the waveforms from the mixer 106 and generate a DC voltage corresponding to the power level of the waveforms. Accordingly, the power detection unit 132 may provide a continuous and generally constant DC voltage corresponding to the power level of the signals from the mixer 106 to the A/D converter 138, which may transfer the power to the microprocessor 140 in digital form. The power detection unit 132 may include an Analog Devices AD8362 TRU-PWR Power Detector, or similar device.

Figure 2A:
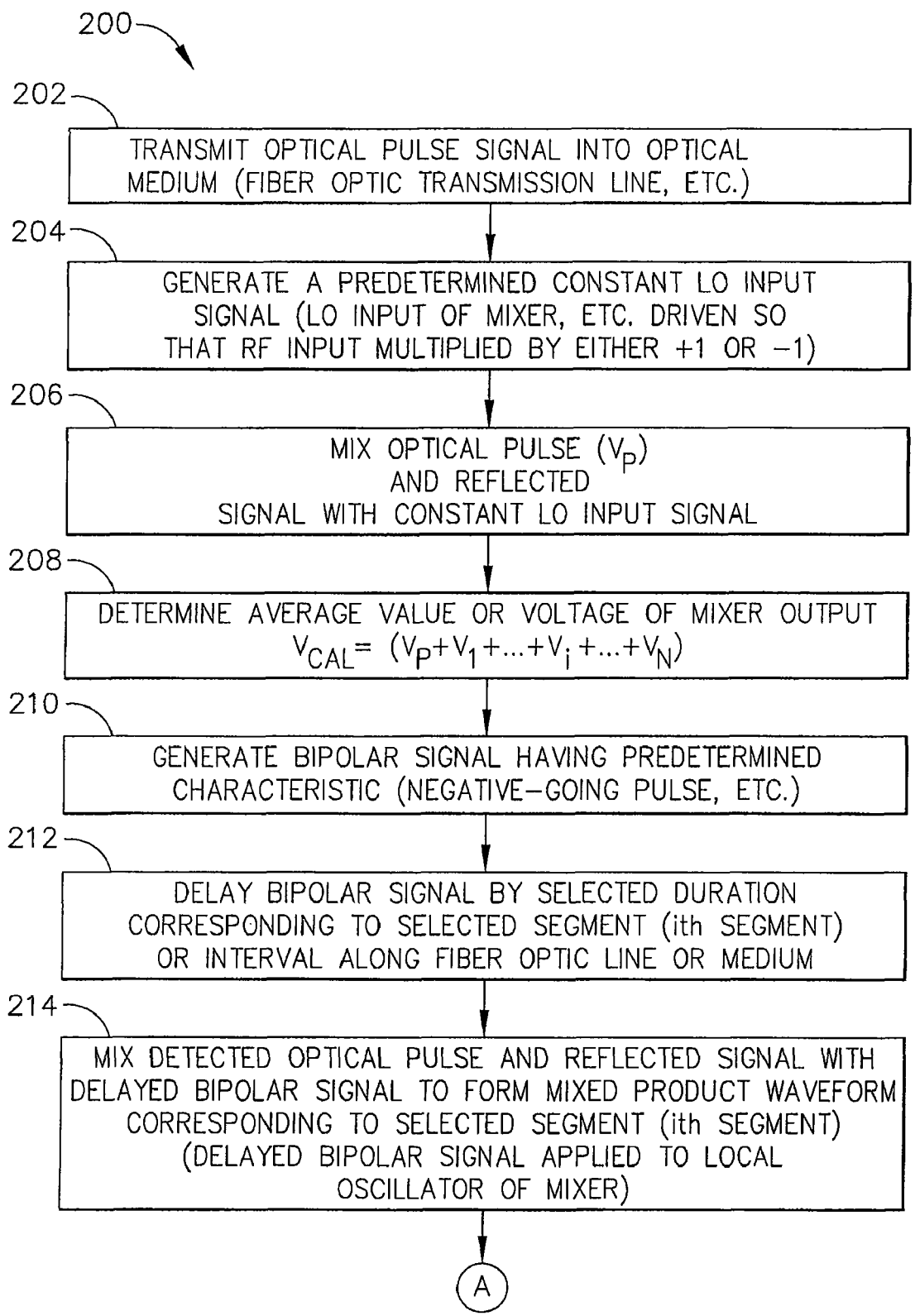
FIGS. 2A and 2B (collectively FIG. 2) are a flow chart of an exemplary method to measure optical characteristics from a selected segment of a fiber optic transmission line or other optical medium in accordance with an embodiment of the present invention.
Figure 2B:
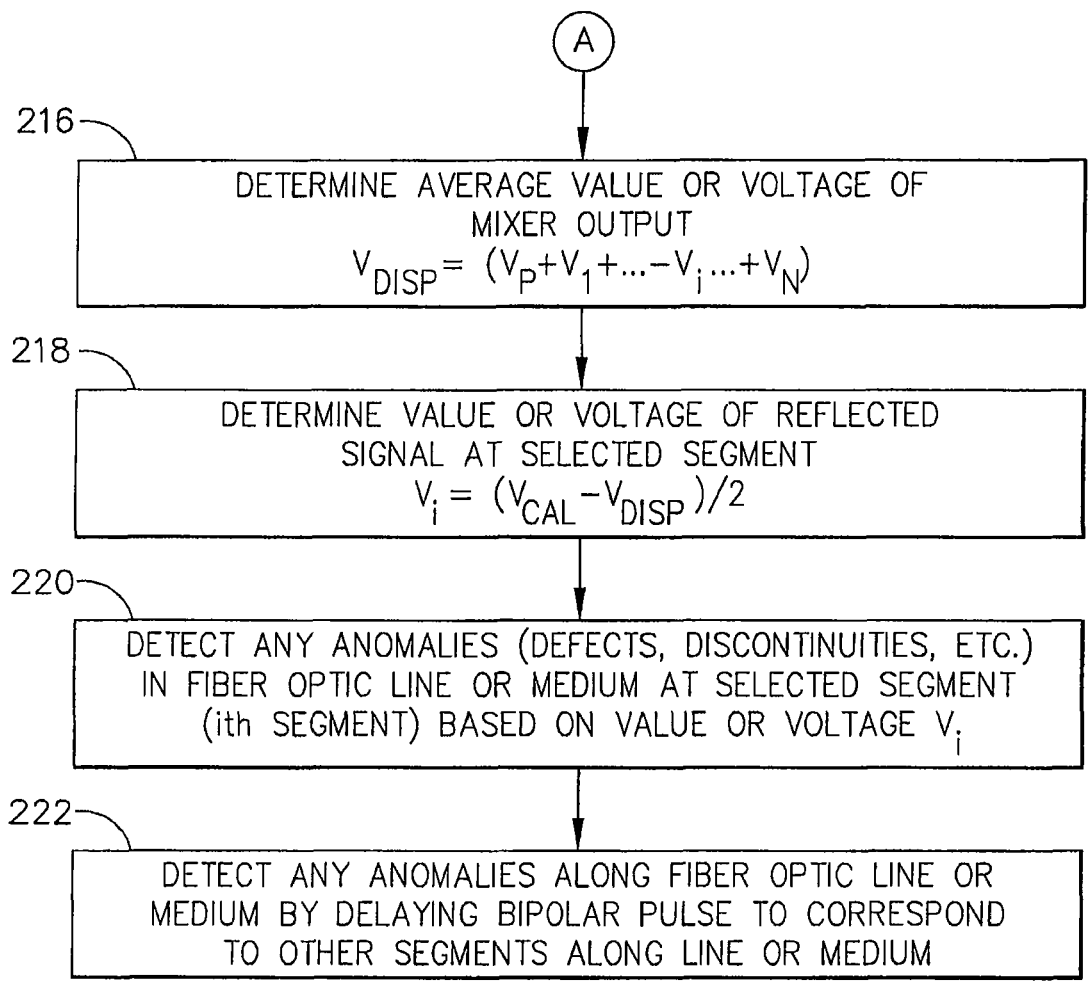

FIGS. 2A and 2B (collectively FIG. 2) are a flow chart of an exemplary method 200 to measure optical characteristics or to detect any anomalies from a selected segment of a fiber optic transmission line or other optical medium in accordance with an embodiment of the present invention. The method 200 may be embodied in the optical system 100 of FIG. 1 or a similar system and may be performed thereby. In block 202, an optical pulse signal may be transmitted into an optical medium, such as a fiber optic transmission line, similar to line 108 of FIG. 1, or other optical medium. The optical pulse signal may be a laser pulse or similar optical pulse.

In block 204, a predetermined constant positive or negative local oscillator (LO) signal may be generated. A local oscillator of a mixer, such as local oscillator 104 of mixer 106 of FIG. 1, or a similar device, may operate optimally if driven either substantially positive or negative hard enough so that a radio frequency (RF) input signal is multiplied by either about a +1 or about a −1.

Figure 3:
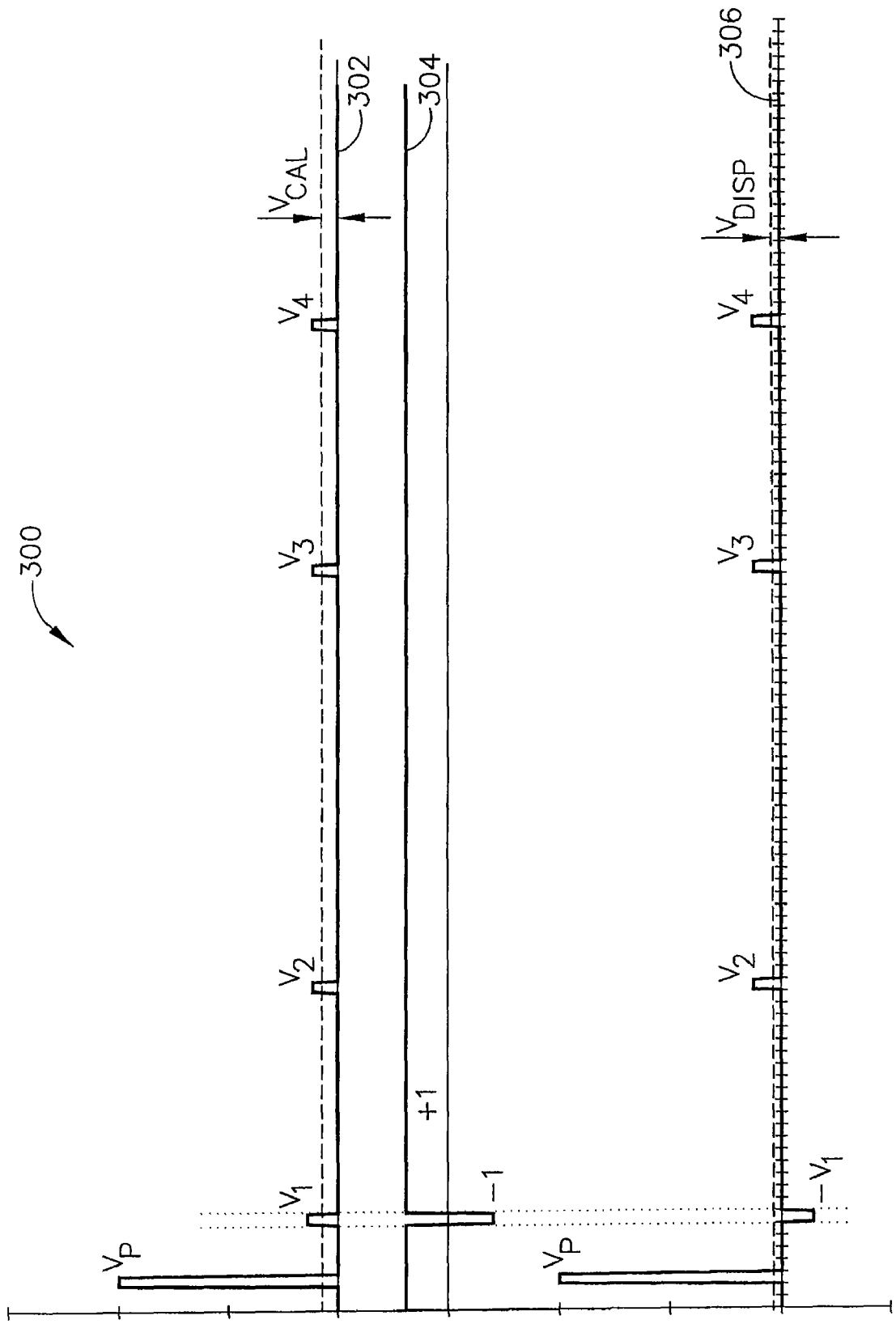
FIG. 3 is a graph of exemplary waveforms to measure optical characteristics of a fiber optic transmission line or other optical medium in accordance with an embodiment of the present invention.

In block 206, the optical pulse ($V_P$) and the reflected signal may be mixed with the constant LO signal. A waveform may be generated containing the optical pulse and reflected signals or pulses. Referring also to FIG. 3, FIG. 3 is a graph 300 of exemplary waveforms 302-306 to measure optical characteristics of a fiber optic transmission line or other optical medium in accordance with an embodiment of the present invention. The waveforms 302-306 may be generated in the mixer-based time domain reflectometer 102 of FIG. 1 and may be representative of the output signals of the A/D converter 138. The waveform 302 in FIG. 3 is an example of a waveform containing a detected optical pulse ($V_P$) transmitted into a fiber optic transmission line or medium and reflected pulses ($V_1$-$V_4$) resulting from portions of the optical pulse ($V_P$) energy being reflected by anomalies, such as connectors similar to connectors 112 of FIG. 1 or the like.

In block 208, an average value or voltage ($V_{cAL}$) of the detected optical pulse ($V_P$) and reflected signal waveform for a fiber optic transmission line or medium segmented into a predetermined number of segments (N) or intervals may be determined. The average value or voltage may be determined without any modulation or signal being applied to a local oscillator of a mixer, such as mixer 106 (FIG. 1). The average value or voltage may be represented by equation 1:

$$V_{CAL} = V_P + \sum_{i=1}^{N} V_i \qquad \text{Eq. 1}$$

In block 210, a bipolar signal or waveform having predetermined characteristics for proper or effective operation of a mixer associated with a reflectometer may be generated. As previously discussed, many active mixer devices, such as the Analog Devices AD8343, expect a local oscillator input of either about +1 or −1, that is, for optimum operation the device is preferably either substantially heavily turned on in the positive direction or substantially heavily turned on in the negative direction. Accordingly, the bipolar signal or waveform may include a negative-going pulse or the like for substantially optimal or effective operation of the reflectometer mixer. Waveform 304 in FIG. 3 is an example of a negative-going pulse in accordance with an embodiment of the present invention.

In block 212, the bipolar pulse of the bipolar signal or waveform may be time delayed by a selected duration corresponding to a selected segment (ith segment) or interval along the fiber optic line or medium to measure optical characteristics or reflections from the selected segment. The negative-going pulse may be thought of as a window that is moveable along the fiber optic line or medium in response to the selected time delay to measure optical characteristics or detect anomalies at the location of the window corresponding to a selected segment of the line or medium.

In block 214, the detected original optical pulse and reflected signal waveform may be mixed, multiplied or modulated, such as in mixer 106 of FIG. 1, by the bipolar pulse waveform to form a mixed product waveform. In block 216, an average value or voltage of the output of the mixer or mixed product waveform ($V_{DISP}$) for the fiber optic transmission line segmented in the predetermined number of segments (N) may be determined. The average value or voltage of the mixed product waveform ($V_{DISP}$) may be represented by equation 2:

$$V_{DISP} = V_P - V_i + \sum_{j \ne i}^{N} V_j \qquad \text{Eq. 2}$$

The average value or voltage may be determined by means, such as the integrator 132 or power detector unit in FIG. 1, and converted to a digital form, such as by A/D converter 138. Referring to FIG. 3, the optical pulse and reflected signal waveform 302 may be mixed with the bipolar pulse waveform 306 to provide the mixed product waveform 306 after integration, such as by integrator 132, and conversion to digital form by A/D converter 138.

In block 218, a value or voltage ($V_i$) at the selected segment (ith segment) may be determined. The value or voltage at the selected segment may include determining the difference between the average value or voltage of the detected optical pulse signal and reflected signal waveform ($V_{CAL}$) and the average value or voltage of the mixed product waveform ($V_{DISP}$). Accordingly, the value or voltage at a selected segment may be represent by equation 3:

$$Vi = \frac{1}{2}(V_{CAL} - V_{DISP}) \quad \text{Eq. 3}$$

In another embodiment of the present invention, the difference ($V_{CAL}-V_{DISP}$) may be amplified by a predetermined factor. Under some circumstances this may be deemed appropriate to take full advantage of the range of the A/D converter. The predetermined factor may be a function of the predetermined number of segments (N) or may be more or less for practical purposes.

In practice, the bipolar pulse or local oscillator window pulse to select a segment as described above may not always align exactly with a reflection pulse from the selected segment of the fiber optic transmission line or other optical medium. In the event of such non-alignment, part of the reflection pulse value will in one segment and the other part will be in an adjacent segment. Adjacent segments with significant values may be assumed to be associated and numerically combined, although this assumption may slightly reduce the temporal resolution of the measurement.

In block 220, optical characteristics, such as any anomalies defects, discontinuities or the like, may be may be measured or detected in the fiber optic transmission line or other optical medium at the selected segment based on the value or voltage associated with the segment. In block 222, anomalies along the fiber optic transmission line or other optical medium may be detected by selectively delaying the bipolar pulse or window pulse to correspond to other segments along the line or medium as previously discussed.

Figure 4:
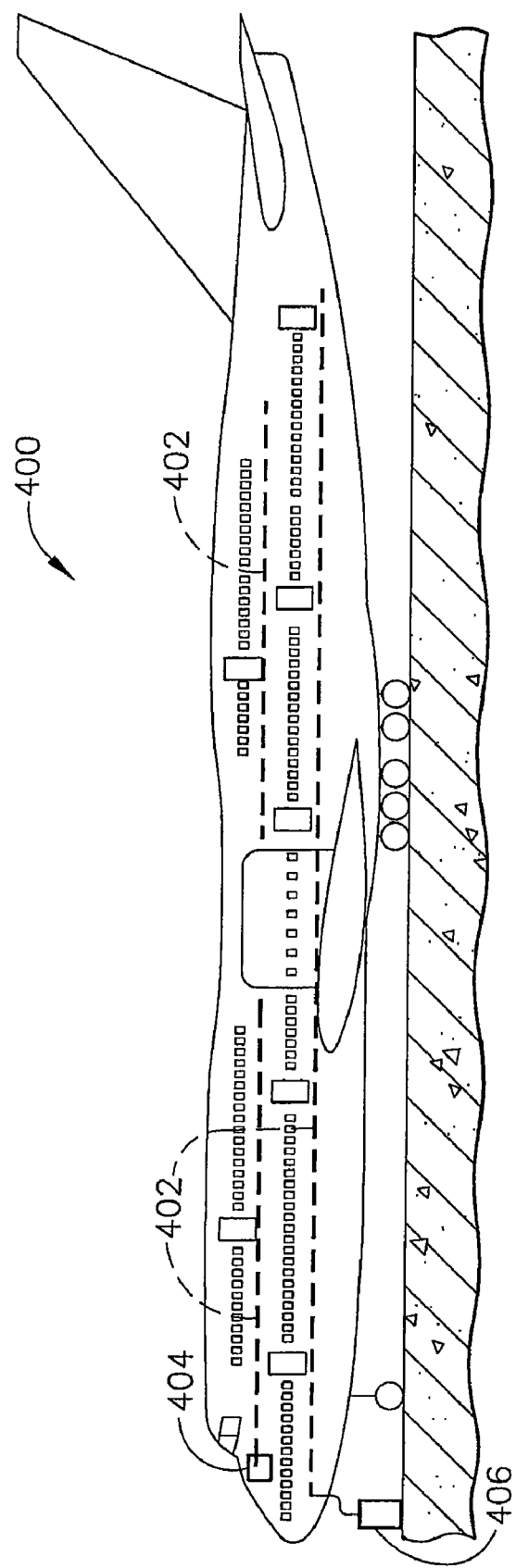
FIG. 4 is an illustration of an exemplary aerospace vehicle including an optical system and mixer-based time domain reflectometer in accordance with an embodiment of the present invention.

FIG. 4 is an illustration of an exemplary aerospace vehicle 400 including an optical system 402 and mixer-based time domain reflectometer device 404 in accordance with an embodiment of the present invention. The aerospace vehicle 400 may be a commercial passenger aircraft as provide by the Boeing Company of Chicago, Ill. or other type of aircraft. The optical systems 402 may be similar to the optical system 100 of FIG. 1. Various embodiments of an optical system, similar to optical system 100 of FIG. 1 may be used in association with various system and sub-systems of the aircraft 400, such as flight control systems, communications systems within the aircraft 400, such as telecommunications systems, in flight entertainment systems, Internet access systems and the like distributed to passenger seating, as well as other aircraft systems. The various embodiments of the optical system 402 and reflectometer device 404 may be used to perform fault-checking and/or operational monitoring of the fiber optic transmission lines or other optical medium that may be included in these various systems.

Although FIG. 4 illustrated the reflectometer devices 404 as possibly being an integral component of the aircraft 400, those skilled in the art will readily understand that one or more embodiments of the reflectometer device 404 may also be incorporated into a portable test device, such as device 406 that may be separately coupled to the various systems and sub-systems of the aircraft 400 to perform any ground-based or other diagnostic analysis on selected optical systems.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is

1. A method to measure optical characteristics from a selected segment of a fiber optic transmission line or other optical medium divided into a predetermined number of segments, the method comprising:
    determining an average value or voltage of an optical pulse and reflected signal waveform without any modulation on a local oscillator;
    applying a bipolar pulse on the local oscillator at a time delay corresponding to the selected segment of the fiber optic transmission line or other optical medium;
    mixing the bipolar pulse and the optical pulse and reflected signal waveform to form a mixed product waveform; and
    determining an average value or voltage of the mixed product waveform to detect an anomalies in the fiber optic transmission line or other optical medium.

2. The method of claim 1, wherein applying the bipolar pulse comprises applying a negative-going bipolar pulse to the local oscillator.

3. The method of claim 1, further comprising detecting any reflections in the fiber optic transmission line or other optical medium at the selected segment based on a value or voltage at the selected segment.

4. The method of claim 1, further comprising determining a value or voltage at the selected segment to detect any reflections at the selected segment.

5. The method of claim 4, wherein determining the value or voltage at the selected segment comprises determining a difference between the average value or voltage of the optical pulse and reflected signal waveform without any modulation and the average value or voltage of the mixed product signal.

6. The method of claim 5, further comprising amplifying the difference between the average value or voltage of the optical pulse and reflected signal waveform without any modulation and the average value or voltage of the mixed product signal by a predetermined factor.

7. The method of claim 5, further comprising amplifying the difference between the average value or voltage of the optical pulse and reflected signal waveform without any modulation and the average value or voltage of the mixed product signal by a predetermined factor that is a function of the predetermined number of segments.

8. The method of claim 1, further comprising detecting any reflections at any other segments along the fiber optic transmission line or other optical medium by time delaying the bipolar pulse to correspond to any of the other segments.

* * * * *

UNITED STATES PATENT AND TRADEMARK OFFICE
CERTIFICATE OF CORRECTION

| | |
|---|---|
| PATENT NO. | : 8,194,239 B2 |
| APPLICATION NO. | : 12/436206 |
| DATED | : June 5, 2012 |
| INVENTOR(S) | : Daniel N. Harres |

It is certified that error appears in the above-identified patent and that said Letters Patent is hereby corrected as shown below:

In the Claims:

Column 8, Line 53, Claim 1: "product waveform to detect an anomalies in the fiber optic" should be -- product waveform to detect any anomalies in the fiber optic --

Signed and Sealed this
Thirty-first Day of July, 2012

David J. Kappos
*Director of the United States Patent and Trademark Office*